Aug. 26, 1958 A. F. WASHBURN 2,848,823
EDUCATIONAL PUZZLE BOOK FOR SPELLING AND WORD ASSOCIATION
Filed April 10, 1957 2 Sheets-Sheet 1

INVENTOR.
ALFRED FRASER WASHBURN
BY
ATTORNEY

Aug. 26, 1958     A. F. WASHBURN     2,848,823
EDUCATIONAL PUZZLE BOOK FOR SPELLING AND WORD ASSOCIATION
Filed April 10, 1957     2 Sheets-Sheet 2
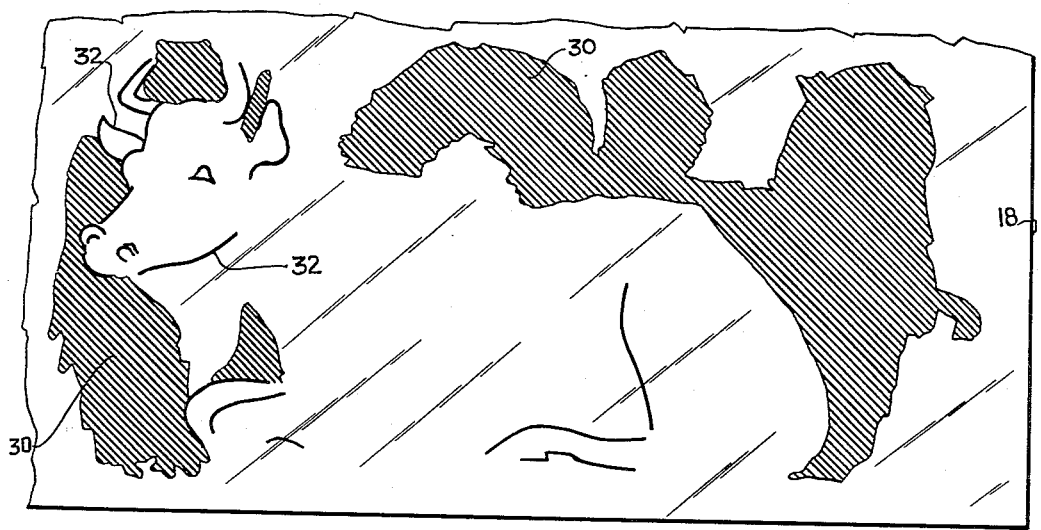
Fig.3.
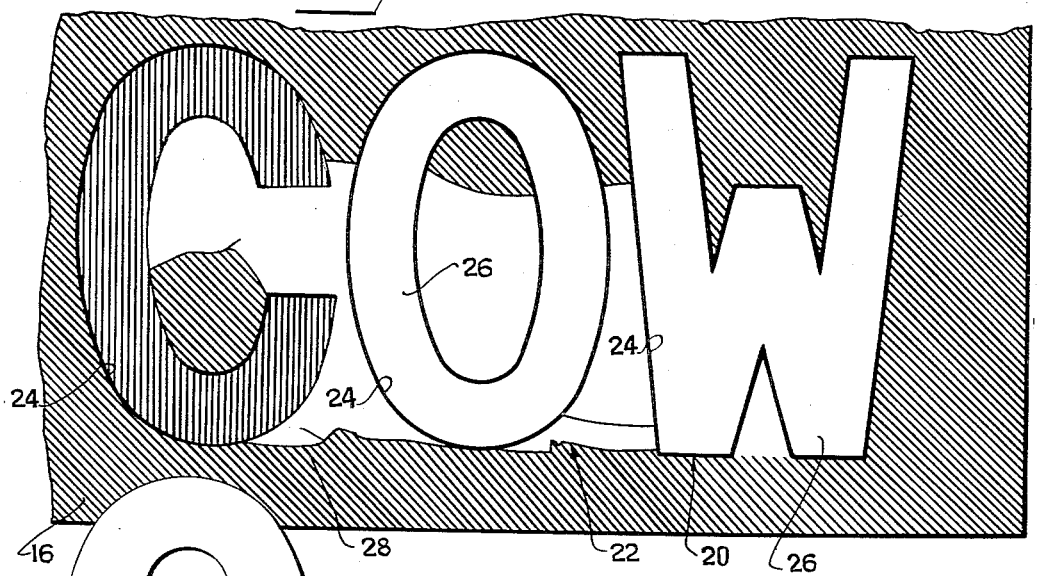
Fig.4.
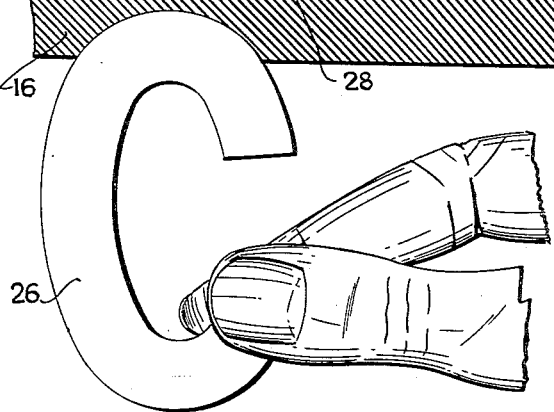
INVENTOR.
ALFRED FRASER WASHBURN
BY
ATTORNEY

2,848,823
EDUCATIONAL PUZZLE BOOK FOR SPELLING AND WORD ASSOCIATION

Alfred Fraser Washburn, Old Tappan, N. J.

Application April 10, 1957, Serial No. 652,029

8 Claims. (Cl. 35—35)

This invention relates to an educational puzzle book, designed particularly for use in teaching small children spelling and word associations, in a manner calculated to provide, at the same time, a high degree of amusement and interest so far as the child is concerned.

It is desirable, of course, to provide combination educational devices and toys, such that a small child, particularly one of kindergarten or pre-school age, can learn the spelling of simple words, can identify objects with said words, and can, at the same time, learn dexterity, article-matching, etc., all in a manner calculated to provide a high degree of interest and amusement.

The main object of the present invention is to provide a combination educational and toy device that will meet the above requirements. To this end, the invention, summarized briefly, comprises a book having stiff pages or plates formed with recesses shaped like and adapted to receive various letters. When the letters are removed, the letter-receiving cavities are of course exposed, and are of a predetermined color. The area surrounding the cavities is painted to provide a partial outline of the object represented by the word that is formed by filling in the cavities occurring in the area so painted. When the cavities are filled in, however, there is still not visible a recognizable object, and one now flips the page next above, on which is painted the remainder of the object, said page being of transparent material such as cellulosic plastic.

In this way, the child first learns to "match," in that the child selects a particular letter that must be used to fit into a particular letter cavity. Secondly, the child learns to spell words, by repeatedly filling in cavities with the appropriate letters to form a whole word. Third, the child learns to identify with the particular word an object, such as an animal, but is prevented from seeing the complete object unless he first spells the complete word by filling in the appropriate cavities.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a fragmentary elevational view, on an enlarged scale, of one of the transparent pages.

Fig. 4 is a view like Fig. 3 of one of the letter-receiving plates located below the page of Fig. 3, one of the letters being illustrated as it appears when being placed in its associated cavity.

Designated generally at 10 is the puzzle book constituting the present invention. This includes a stiff back cover 12, which may be of cardboard or similar material, and a front cover 14 which may be of the same material.

The contents of the book may vary, but the principles of the invention will be retained throughout. Further, the number of pages may vary and in Figs. 1 and 2, purely by way of illustration, there is shown a book having four main pages or plates, each having two pictures thereon, so that the book contains a total of eight pictures and words. This, of course, is only by way of example, and in a commercial embodiment the book would probably hold about ten or twelve main pages, each having two or more words and associated, pictorially represented, objects.

In any event, the book is so designed that each main or "letter" page 16 has associated therewith an overlay page 18 of thin, flexible transparent material. Thus, as will be seen from Figs. 1 and 2, in the illustrated example there are four sets of pages, each set comprising a stiff, thick main page or plate 16 and a thin, flexible, transparent overlay page 18.

At this point, it is worthy of note that the invention might be incorporated in a game board or other article, rather than in a book, that is one or more sets each including a plate 16 and an overlay 18 can be used other than as pages of a book.

Further, any number of words can be placed on a single page.

Figure 1:
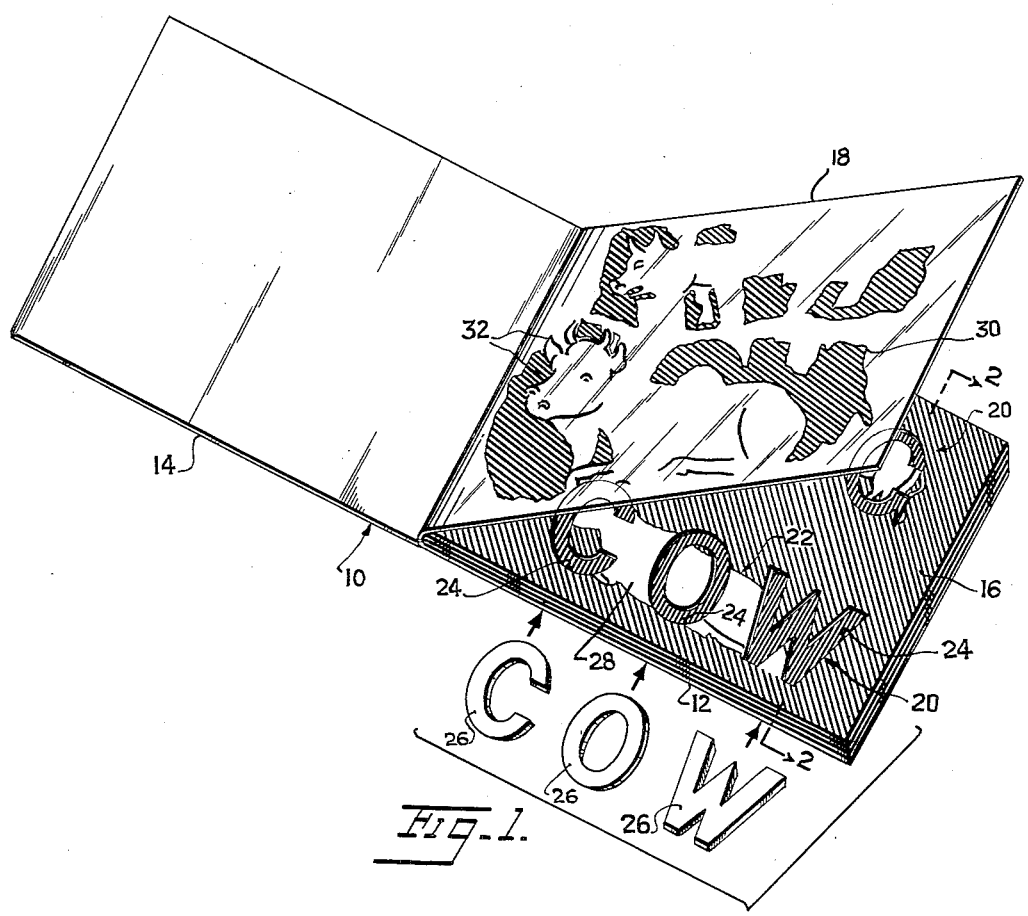
Fig. 1 is a perspective view, partially exploded, of an educational puzzle book according to the present invention.
Figure 2:
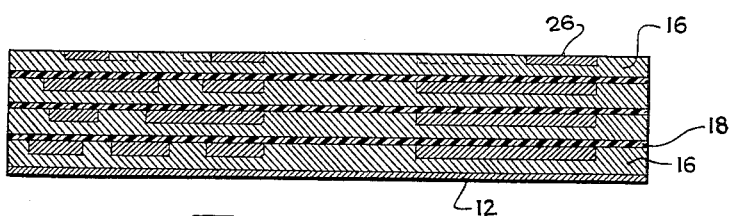
Fig. 2 is an enlarged transverse sectional view through the book on line 2—2 of Fig. 1, with the letter inserts in place.

In the illustrated example the plate 16 that is exposed in Fig. 1 is the uppermost plate of the book, and has a word "cow." To provide said word, the top surface of the plate is cut out to form shallow recesses 24 adapted to receive letter inserts 26 shaped correspondingly to the recesses.

As will be seen from Fig. 4, in which the letter insert comprising the letter "C" has been removed from its associated recess, the bottoms and side walls of the recesses are painted red or some other vivid color that is foreign to an object 22 pictorially delineated in the same area as that in which the recesses are formed. Therefore, when a letter insert or inserts is removed, the object 22 becomes completely unrecognizable, even if the transparent cover plate or page 18 is lowered into position overlying the plate 16.

In the illustrated example, the plate 16 is colored completely green, except for the red painting of the bottoms of the cavities, and except for white areas which represent the object 22, the letter inserts also being completely white in carrying out the invention.

These contrasting colors are of importance, in that they contribute in preventing recognition of an article until the word has been completely spelled by the child, and further prevent recognition until the transparent cover sheet, which has apparently meaningless blotches of color thereon, is lowered into position over the plate 16 associated therewith.

In the representation of the cow, there is a white area 28 occurring between cavities 24, and this white area, when viewed with page 18 raised as in Fig. 1, has no significance and is incapable of being recognized as anything known to the child. The area is completely unrecognizable when the letter inserts 26 are removed from the cavities. Even when the letters are replaced in the cavities 24, one still is unable to recognize the article with facility as a cow.

However, if the child places the inserts 26 in the appropriate cavities 24 to completely spell the word "cow" and then lowers the overlay page 18, the child will now see a cow where previously it was impossible to recognize the object. This is due to the fact that green-colored areas 30 are painted upon the transparent page 18 that will cover some of the white areas of plate 16, leaving only white areas that form the outline of the object. Also painted upon the transparent page are black lines 32, which may show particularly prominent or important features of the animal, such as the eyes, horns, nose, tail, etc. If the page 18 had been lowered before the word was completely spelled, one would see red marks through the unpainted material of the page 18, and this would prevent recognition of the cow. With the letter inserts in place, however, the page 18 dropped into place, one immediate perceives the complete object.

It thus becomes apparent that the child must first of all match the inserts 26 to their appropriate recesses or cavities 24. Secondly, the child must practice dexterity in placing the inserts 26 in the cavities 24. Third, the child must learn to put all the inserts in the cavities, to completely spell the word. Fourth, the child must then learn to lower the page 18 to see the object represented by the word. In this way, the child learns dexterity, article-matching, spelling, and association of the spelled word with the article that the word represents.

The idea is carried forth, of course, in all the other pages of the books, and a great number of different articles can be represented, as, for example, cars, buses, ducks, boats, dogs, cats, etc. In every instance, of course, the principle remains the same.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. In a puzzle, a plate having spaced colored cavities, inserts shaped to fit into the cavities and adapted to delineate part of the recognizable object, and an overlay having colored opaque and transparent areas coacting with the inserts in completing the representation of said object, so as to permit recognition of the object responsive only to filling of the cavities with the inserts and placement of the overlay over the plate, said plate having areas of contrasting colors coacting with the inserts and the opaque areas of the overlay in defining said recognizable object, said overlay further including lines arranged to delineate parts of said object.

2. In a puzzle, a colored plate having spaced contrasting colored cavities, inserts shaped to fit into the cavities and adapted to delineate part of a recognizable object, and an overlay having colored opaque and transparent areas coacting with the inserts in completing the representation of said object, so as to permit recognition of the object responsive only to filling of the cavities with the inserts and placement of the overlay over the plate, said cavities and inserts being in the shapes of object-denoting letters of the alphabet.

3. In a puzzle, a plate having spaced cavities, inserts shaped to fit into the cavities and adapted to delineate part of a recognizable object, and an overlay having opaque and transparent areas coacting with the inserts in completing the representation of said object, so as to permit recognition of the object responsive only to filling of the cavities with the inserts and placement of the overlay over the plate, said cavities and inserts being in the shapes of different letters of the alphabet, the cavities being arranged in a set forming a word that constitutes the name of the object.

4. In a puzzle, a plate having spaced cavities, inserts shaped to fit into the cavities and adapted to delineate part of a recognizable object, and an overlay having opaque and transparent areas coacting with the inserts in completing the representation of said object, so as to permit recognition of the object responsive only to filling of the cavities with the inserts and placement of the overlay over the plate, said cavities and inserts being in the shapes of different letters of the alphabet, the cavities being arranged in a set forming a word that constitutes the name of the object, said cavities having bottoms of colors contrasting strongly with the opaque areas and the colors of those areas of the plate immediately adjacent the cavities, so as to prevent recognition of the object unless the cavities are filled with inserts.

5. In a puzzle book, a set of pages including a stiff, plate-like main page having a plurality of cavities in the shape of letters, said cavities being arranged so as to form a word, said main page having areas of contrasting colors on which the word is superimposed to define part of the outline of an object which is represented by the word, letter-shaped inserts adapted to be snugly, removably fitted in the cavities and colored correspondingly to adjacent areas of the main page so as to cooperate with said adjacent areas in further outlining the object; and a transparent page adapted to be superimposed upon the main page and having a partial representation of said object cooperating with the partial representation provided by the main page and insert so as to permit recognition of the object responsive to filling of the cavities with the inserts and positioning of the transparent page upon the main page.

6. In a puzzle book, a set of pages including a stiff, plate-like main page having a plurality of cavities in the shape of letters, said cavities being arranged so as to form a word, said main page having areas of contrasting colors on which the word is superimposed to define part of the outline of an object which is represented by the word, letter-shaped inserts adapted to be snugly, removably fitted in the cavities and colored correspondingly to adjacent areas of the main page so as to cooperate with said adjacent areas in further outlining the object; and a transparent page adapted to be superimposed upon the main page and having a partial representation of said object cooperating with the partial representation provided by the main page and insert so as to permit recognition of the object responsive to filling of the cavities with the inserts and positioning of the transparent page upon the main page, said cavities having bottom surfaces colored to contrast strongly with the coloring of the adjacent areas of the main page so as to prevent recognition of the object at any time when one or more of the inserts is not in place.

7. In a puzzle book, a set of pages including a stiff, plate-like main page having a plurality of cavities in the shape of letters, said cavities being arranged so as to form a word, said main page having areas of contrasting colors on which the word is superimposed to define part of the outline of an object which is represented by the word, letter-shaped inserts adapted to be snugly, removably fitted in the cavities and colored correspondingly to adjacent areas of the main page so as to cooperate with said adjacent areas in further outlining the object; and a transparent page adapted to be superimposed upon the main page and having a partial representation of said object cooperating with the partial representation provided by the main page and insert so as to permit recognition of the object responsive to filling of the cavities with the inserts and positioning of the transparent page upon the main page, said cavities having bottom surfaces colored to contrast strongly with the coloring of the adjacent areas of the main page so as to prevent recognition of the object at any time when one or more of the inserts is not in place, said transparent page having areas colored only in one of the colors of the main page.

8. In a puzzle book, a set of pages including a stiff, plate-like main page having a plurality of cavities in the shape of letters, said cavities being arranged so as to form a word, said main page having areas of contrasting colors on which the word is superimposed to define part of the outline of an object which is represented by the word, letter-shaped inserts adapted to be snugly, removably fitted in the cavities and colored correspondingly to adjacent areas of the main page so as to cooperate with said adjacent areas in further outlining the object; and a transparent page adapted to be superimposed upon the main page and having a partial representation of said object cooperating with the partial representation provided by the main page and insert so as to permit recognition of the object responsive to filling of the cavities with the inserts and positioning of the transparent page upon the main page, said cavities having bottom surfaces colored to contrast strongly with the coloring of the adjacent areas of the main page so as to prevent recognition of the object at any time when one or more of the inserts is not in place, said transparent page having areas colored only in one of the colors of the main page, said transparent page further including lines representing portions of the object.

References Cited in the file of this patent

UNITED STATES PATENTS

| | | |
|---|---|---|
| 1,230,263 | Alexander | June 19, 1917 |
| 1,273,763 | Garman | July 23, 1918 |
| 2,149,779 | Kroner | Mar. 7, 1939 |
| 2,670,961 | Winters | Mar. 2, 1954 |